No. 754,954. PATENTED MAR. 15, 1904.
C. F. DIECKMANN.
FINE ADJUSTMENT FOR MICROSCOPES.
APPLICATION FILED DEC. 9, 1903.

NO MODEL.

Witnesses:
E. A. Volk.

Carl F. Dieckmann, Inventor.
By Wilhelm Bonner, Attorneys.

No. 754,954.

Patented March 15, 1904.

UNITED STATES PATENT OFFICE.

CARL F. DIECKMANN, OF BUFFALO, NEW YORK, ASSIGNOR TO SPENCER LENS COMPANY, OF BUFFALO, NEW YORK.

FINE ADJUSTMENT FOR MICROSCOPES.

SPECIFICATION forming part of Letters Patent No. 754,954, dated March 15, 1904.

Application filed December 9, 1903. Serial No. 184,379. (No model.)

*To all whom it may concern:*

Be it known that I, CARL FREDERICK DIECKMANN, a citizen of the United States, residing at Buffalo, in the county of Erie and State of New York, have invented new and useful Improvements in Fine Adjustments for Microscopes, of which the following is a specification.

This invention relates to micrometer adjusting mechanisms, and more particularly to fine adjustments for microscopes.

The object of the invention is to provide a fine adjustment of simple, strong, durable, and efficient construction which operates easily and smoothly and enables a very accurate and minute adjustment of the tube.

Figure 1:
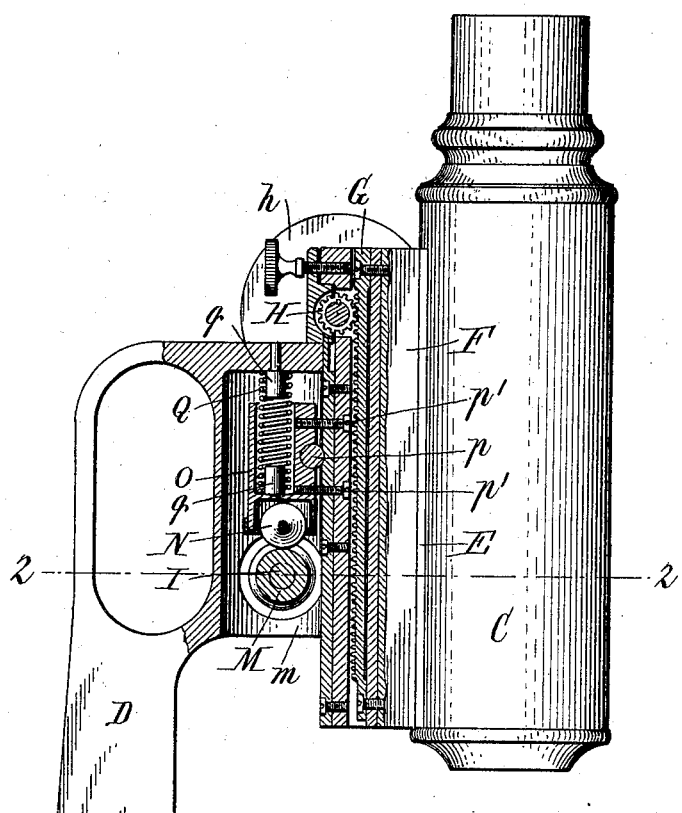
Figure 2:
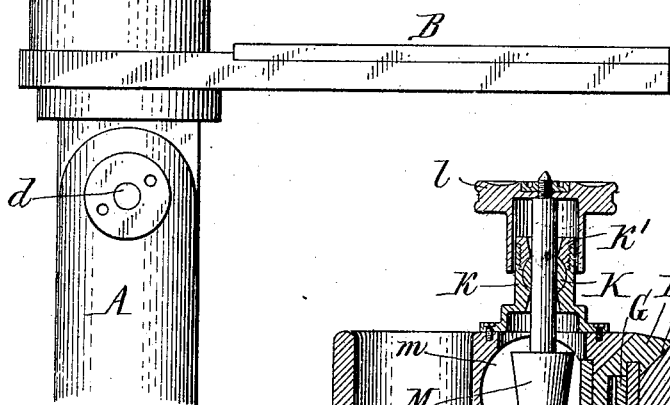

In the accompanying drawings, Figure 1 is an elevation, partly in section, of a portion of a microscope provided with a fine adjustment embodying the invention. Fig. 2 is a horizontal section thereof in line 2 2, Fig. 1.

Like letters of reference refer to like parts in both figures.

A represents the supporting-pillar; B, the stage; C, the tube, and D the tube arm or bracket which carries the tube and stage and which, as usual, is hinged at $d$ to the supporting-pillar to enable the tube and stage to be tilted or moved to a desired position to facilitate a better inspection of the specimen supported by the stage. The tube is provided on its rear side with a longitudinal block or slide E, which is confined and slides endwise in a guide groove or way $e$ of suitable form in an auxiliary slide F, which in turn is confined and slides longitudinally in a guide groove or way $f$ of suitable form in the upper lateral portion of the tube-arm. The tube has secured to it a toothed rack G, with which coöperates a gear-pinion H, secured to and operated by a shaft provided with milled heads $h$ for effecting the coarse adjustment of the tube. These parts are all well-known adjuncts of a microscope and need not be herein described in detail. They may be constructed as shown in the drawings or may be of any other known or suitable construction.

The fine adjustment is preferably constructed as follows:

I represents a horizontal micrometer screw-shaft which extends transversely through suitable holes in the lateral portion of the tube-arm in rear of and adjacent to the auxiliary slide F. One end of the micrometer-shaft is screw-threaded and bears and works in a stationary nut or sleeve $i$, which is formed on or fixed to the tube-arm in any suitable manner. In the construction shown the inner threaded end of the nut is screwed into the transverse hole in the tube-arm, which is threaded for this purpose, the nut extending out from the arm to provide an extended bearing for the shaft. The other end of the shaft is cylindrical and passes through and bears in a hole in a spherical bearing-block K, which is mounted to turn universally in a spherical socket formed in a bearing-sleeve $k$, formed on or secured to and projecting from the tube-arm. The retaining-socket for the spherical bearing-block is formed partially in the bearing-sleeve $k$ and partially in a nut $k'$, screwed into the outer end of the bearing-sleeve. The hole through the bearing-sleeve $k$ preferably flares or is enlarged at opposite sides of the spherical bearing-block to permit angular movements of the shaft. The micrometer-shaft is provided, preferably at each end, with a milled operating head or knob $l$, which is secured to the shaft in any convenient manner. The spherical bearing-block is free to turn in its socket and accommodates itself to the direction of the shaft, thus preventing the latter from binding in its bearings in case the shaft-bearings for any reason are not in exact alinement and insuring the smooth easy operation of the micrometer-shaft. The tube-arm is provided with a vertical chamber $m$, and an adjusting-cone M is secured on the micrometer-shaft in said chamber.

N represents an antifriction-roller, which is mounted on the auxiliary slide and bears on the adjusting-cone. When the micrometer screw-shaft is turned, its screw-threaded engagement with its bearing-nut $i$ effects a longitudinal as well as a rotary movement of the adjusting-cone, causing the bearing-roller to follow a helical path on the adjusting-cone and elevating or lowering the auxiliary slide and tube, according to the direction of rotation of the micrometer-shaft. As the change of elevation of the slide and tube caused by a complete revolution of the adjusting-cone is only equal to the difference in elevation of the contact-points of the roller with the adjusting-cone before and after turning the latter, an exceedingly minute and accurate adjustment can be secured by employing an adjusting-cone of small pitch, and this without necessitating a very fine thread on the shaft.

The bearing-roller N is preferably journaled on a block O, which is located in the chamber in the tube-arm and is fulcrumed intermediate of its ends on the auxiliary slide by a cylindrical bearing-piece $p$, seated against the slide. Adjusting-screws $p'$ pass loosely through holes in the slide and are screwed into threaded holes in the adjustable block on opposite sides of its fulcrum. By turning one screw in and the other out the adjustable block can be shifted to cause the rollers to bear on top of the adjusting-cone directly over its axis.

Q represents a spring arranged in the chamber in the tube-arm between the adjustable block and the end of the chamber. One end of the spring preferably enters a pocket in the adjustable block, and both ends are held in place by studs $q$ on the arm and adjustable block projecting into the ends of the spring. This spring acts to force the auxiliary slide F downward in its ways and hold the bearing-roller in contact with the adjusting-cone, which is desirable, especially when the tube is tilted over so far as to take its weight off of the cone.

R represents a graduated disk or collar, which is mounted on the bearing-nut for the micrometer-shaft to turn with the latter to indicate the arc through which the shaft is turned. The disk is held on the bearing-nut by a nut $r$ and is caused to turn with the shaft by a pin or the like $r'$ on the hub of the milled head of the shaft engaging in a longitudinal slot $r^2$ in the hub of the graduated disk.

The described arrangement and construction of the fine adjustment with the horizontal micrometer-shaft is desirable. The operating-heads of the shaft are in convenient reach of either hand of the operator, and as the parts of the adjustment are located in the lateral portion of the tube-arm adjacent to the tube the tube can be located as far as desirable from the upright portion of the arm, thus giving ample room for the manipulation of the specimen-slide, while at the same time the leverage on the adjustment and consequent friction due to the weight of the tube are reduced to the minimum.

I claim as my invention—

1. The combination of an adjusting-cone, means for turning and moving the same longitudinally, a movable member, and a part which is connected to said movable member and bears against said adjusting-cone, substantially as set forth.

2. In a microscope, the combination of the tube, a coarse adjustment for the same, and a fine adjustment comprising a longitudinally-movable screw operating-shaft arranged horizontally adjacent to said tube, and means operated by said shaft for moving said tube, substantially as set forth.

3. The combination of a microscope-tube, an adjusting-cone for the same, means for turning and moving said cone longitudinally, and a part which is connected to said tube and bears against said adjusting-cone, substantially as set forth.

4. The combination of a microscope-tube, a supporting-arm for the same, an adjusting-cone mounted in said arm to turn and move longitudinally, means for operating said cone, and a part which is connected to said tube and bears on said supporting-cone, substantially as set forth.

5. The combination of a microscope-tube, a shaft provided with a screw-threaded portion, a stationary nut in which the threaded portion of said shaft works, an adjusting-cone on said shaft, and a roller connected to said tube and bearing on said adjusting-cone, substantially as set forth.

6. The combination of a microscope-tube, a shaft provided with a screw-threaded portion, a stationary nut in which the threaded portion of said shaft works, a universally-movable bearing-block for said shaft, an adjusting-cone on said shaft, and a roller connected to said tube and bearing on said adjusting-cone, substantially as set forth.

7. The combination of a microscope-tube, an adjusting-cone, means for turning and moving said cone longitudinally, a roller bearing on said cone, and a block adjustably connected to said tube and on which said roller is journaled, substantially as set forth.

8. In a fine adjustment for microscopes, the combination of a movable member, an operating-shaft, a rotatable cone mounted on one of said parts and a device on said other part bearing against said cone, substantially as set forth.

Witness my hand this 30th day of November, 1903.

CARL F. DIECKMANN.

Witnesses:
CHAS. W. PARKER,
C. M. BENTLEY.